United States Patent
Edwards et al.

(10) Patent No.: US 10,078,824 B2
(45) Date of Patent: Sep. 18, 2018

(54) PLATFORM AND METHOD FOR INTEGRATING SERVICES IN A TERMINAL OR KIOSK

(75) Inventors: Thomas V. Edwards, Suwanee, GA (US); John C. Goodwin, III, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 778 days.

(21) Appl. No.: 12/956,673

(22) Filed: Nov. 30, 2010

(65) Prior Publication Data
US 2012/0136736 A1 May 31, 2012

(51) Int. Cl.
*E05B 75/00* (2006.01)
*G06Q 20/20* (2012.01)
*G06Q 30/06* (2012.01)

(52) U.S. Cl.
CPC .......... *G06Q 20/202* (2013.01); *G06Q 30/06* (2013.01)

(58) Field of Classification Search
USPC ............................................ 705/21; 235/379
See application file for complete search history.

(56) References Cited

U.S. PATENT DOCUMENTS

| | | | |
|---|---|---|---|
| 6,195,694 B1* | 2/2001 | Chen .................. | G07F 17/0014 709/203 |
| 6,308,887 B1* | 10/2001 | Korman ................. | G06Q 20/18 235/379 |
| 6,510,990 B2* | 1/2003 | Goodwin, III ..... | G06K 17/0022 235/383 |
| 7,072,937 B2* | 7/2006 | Neebe ....................... | G07F 5/18 700/241 |
| 7,272,570 B2* | 9/2007 | Sadler ....................... | G06F 9/54 235/7 R |
| 7,357,316 B2* | 4/2008 | Heckel ................... | G06Q 30/02 235/375 |
| 7,519,653 B1* | 4/2009 | Coutts .................... | G06Q 20/00 235/381 |
| 7,686,217 B2* | 3/2010 | Heckel ................... | G06Q 30/02 235/375 |
| 7,711,600 B1* | 5/2010 | Curran ................. | G06Q 10/087 705/16 |
| 7,904,333 B1* | 3/2011 | Perkowski ........ | G06F 17/30879 705/14.4 |
| 7,912,914 B2* | 3/2011 | Coutts ................ | G06Q 20/1085 709/212 |
| 8,027,847 B1* | 9/2011 | Francis .................. | G06Q 30/06 705/2 |
| 8,190,530 B2* | 5/2012 | Redmond ............ | G06Q 20/027 705/16 |
| 9,003,080 B2* | 4/2015 | Bachrany .................. | G06F 3/00 710/37 |
| 2005/0165658 A1* | 7/2005 | Hayes, Jr. .............. | G06Q 10/10 705/26.43 |
| 2005/0240919 A1* | 10/2005 | Kim ......................... | G06F 8/65 717/168 |

(Continued)

*Primary Examiner* — Talia F Crawley
(74) *Attorney, Agent, or Firm* — Schwegman, Lundberg & Woessner (57) ABSTRACT

A software platform and method are presented for integrating loosely coupled services or offerings provided across a retail environment into self-service terminals configured to perform different type of retail functions. The integration is accomplished with little or no modifications to existing software applications that provide the services or offerings.

12 Claims, 6 Drawing Sheets

(56) References Cited

U.S. PATENT DOCUMENTS

| | | | | |
|---|---|---|---|---|
| 2006/0074717 A1* | 4/2006 | Feldman | ................ | G06Q 30/02 |
| | | | | 705/3 |
| 2006/0149640 A1* | 7/2006 | Gordon | ................ | G06Q 20/20 |
| | | | | 705/26.2 |
| 2007/0043579 A1* | 2/2007 | Kent | ................ | G06O 30/0283 |
| | | | | 705/26.1 |
| 2008/0015940 A1* | 1/2008 | Sadler | ................ | G06F 9/54 |
| | | | | 705/16 |
| 2010/0036670 A1* | 2/2010 | Hill | ................ | G06O 30/016 |
| | | | | 705/304 |
| 2010/0183125 A1* | 7/2010 | Hayes, Jr. | ................ | G06Q 10/10 |
| | | | | 379/88.01 |
| 2012/0136736 A1* | 5/2012 | Edwards | ................ | G06Q 20/202 |
| | | | | 705/21 |

\* cited by examiner

PLATFORM AND METHOD FOR INTEGRATING SERVICES IN A TERMINAL OR KIOSK

FIELD OF THE INVENTION

The present invention relates generally to software performing retail transactions. More particularly, but not exclusively, the invention relates to a platform and method that integrates loosely coupled services or offerings provided across a retail environment into self-service terminals configured for different retail functions.

BACKGROUND

In general, large retail stores have multiple departments or centers, each designed to provide related products or services. The types of departments or centers include: a grocery center, a tire or auto center, a pharmacy center, an event ticket center or kiosk, a DVD rental or purchase center or kiosk, an eye care center, a travel center, a banking center and others. Each center or department may have one or more self-service terminals or kiosks used to schedule or purchase products or services for the specific center or department wherein they are located. For example, a Pharmacy center kiosk has functions that include allowing a customer to request a refill or check the status of a prescription. A tire and auto center kiosk has functions that include allowing a customer to schedule an oil change, tire rotation or other vehicle service. An event ticket kiosk has functions that include allowing a customer to purchase a ticket for an event. A grocery center has multiple self-checkout or assisted checkout terminals where a customer can purchase items.

In each of the above examples, a customer using a terminal or kiosk will identify themselves as they perform a function specific to the retail center where the terminal is located. However, software performing a function for one retail center is not aware of a customer's actions or history performed at another retail center. For example, the specific software application that allows a customer to identify and purchase an event ticket is not aware of the status of a prescription being refilled and would not be able to add the cost of the prescription to the cost of a ticket allowing the customer to make a single payment for both. This and additional problems exists for applications performing specific functions in other retail centers. Because there are so many current functions (e.g., purchasing tickets, refilling prescriptions, scheduling service, etc.) and additional functions are being added from time to time, the software that performs a single specific function cannot easily be designed to support and provide all the functions that maybe provided by the different retail centers in a retail store.

Thus, a need exists for a low cost platform and method that integrates the loosely coupled functions and services of each retail center and makes them available on all of the different terminals and kiosks.

SUMMARY OF THE INVENTION

Among its several aspects, the present invention recognizes a condition wherein software applications that perform a set of functions tailored to one retail center do not also support functions tailored to the other retail centers. This condition prevents a customer from performing functions related to more than one retail center from a single terminal. It also prevents software applications that perform a set of functions for a first retail center from receiving notification that a customer is performing a function on a terminal in a second retail center and then providing a notice or function related to the first retail center on the second retail center's terminal.

The invention addresses this problem, as well as others, by recognizing that a software application, such as a transaction session manager described herein, can be added to each terminal and kiosk in the different retail centers to allow functions for different retails centers to operate on each terminal and kiosk without modifying the existing software applications that provide the retail center functions. The transaction session manager application performs functions that are transparent to the software applications that provide the functions of the retail center and to the system software that manages the program environment and hardware attached to the terminal or kiosk.

The transaction session manager is logically placed between the one or more software applications that provide the high-level functions of a specific retail center and the applications and system software that provide the low-level functions of the terminal or kiosk. The low-level functions include control for devices attached to the terminal or kiosk, a basic user interface and basic retail functions. The basic retail functions include functions that: implement credit card transactions (e.g., read credit card information and communication with an external computer to perform a credit transaction); input bar code data from an attached bar code scanner for an item and use a product code database to lookup additional information on the scanned item; and other functions related to a performing a purchase transaction.

The transaction session manager monitors communications between the applications providing the high-level functions and the applications or system software providing the low-level and system functions. When the transaction session manager identifies certain information in a communication, such as information identifying a customer using the terminal or kiosk, it sends a copy of the information to a server application.

The server application is typically executing on a store server computer that is connected to each terminal or kiosk in the different retail centers over a computer network. The store server also supports one or more databases that are used to support functions in the different retail centers.

The server application uses the customer information and the one or more databases to determine what functions the customer has performed or requested in other retail centers and determines if a notification should be sent to the customer related to these functions. If the server application determines that a notice should be sent to the customer, it generates a message containing the notice information and sends it back to the transaction session manager. The transaction session manager receives the message, puts the message contents in a standard format that will cause the message to be displayed to the customer and sends the message to the application software providing the high-level functions for the terminal or kiosk. The application software providing the high-level functions receives the message and displays it to the customer. The message may include a notice that a prescription is ready or a reminder that an oil change is overdue. The message will include an encoded trigger when a customer can select to perform an action related to the notice such as scheduling an oil change.

If a customer selects to perform an action provided in the displayed message, the application software identifies the encoded trigger and sends a communication with the encoded trigger. The application software has no knowledge of the contents of the displayed message or what action is being provided and requested. Therefore, any type of message can be displayed and any type of action can be provided to the customer without requiring any changes to the application software providing the high-level local retail center functions.

The transaction session manager receives the communication from the application software with the encoded trigger and sends it to the server application. The application software providing the high-level functions then stops displaying the message to the customer and returns to normal operations for that retail center. If the server application determines from the encoded trigger that a remote function is being requested by the customer, it sends a message to the transaction session manager requesting to take remote control of the terminal or kiosk. The transaction session manager provides a remote terminal control function that allows the server application to take over control of the user interface and the devices attached to the terminal or kiosk. The application software controlling the high-level functions is not aware that it has lost control of the terminal when the remote control function is active.

The server application using the remote control function interacts with the customer to perform the requested function. When the function is complete, the server application sends a message to the transaction session manager to terminate the remote control of the terminal which causes control to be returned to the application providing the high-level functions. During the remote control operation, the server application sends messages to the transaction session manager with instructions to display information or control certain devices and the transaction session manager sends to the server application data received from devices attached to the terminal. The transaction session manager intercepts this data from the applications performing low-level functions and from system applications. These applications believe they are communicating with the application software providing the high-level functions but the transaction session manager is transparently intercepting the communications and routing them to the server application. Because the actions of the transaction session manager are transparent, little or no changes must be made to the application software that implements the functions of a retail center.

If a charge for a product or service results from the remote control operation performed by the server application, the server application can send a message to the transaction session manager and request that a charge for the item be added to a current purchase transaction. The transaction session manger will then send a communication to the application software performing the high-level functions. The communication simulates a communication that is sent when an item is scanned for purchase. In this case, the communication has information for the item in the requested charge. The application software then adds the item and charge to the current purchase transaction as if the item was actually scanned by the terminal.

A more complete understanding of the present invention, as well as further features and advantages of the invention, will be apparent from the following Detailed Description and the accompanying drawings.

DETAILED DESCRIPTION

In the following description, numerous details and embodiments are set forth to provide an understanding of the claimed invention. However, it will be appreciated by those skilled in the art that various modifications to the described embodiments may be made without departing from the spirit and scope of the invention and that numerous variations or modifications from the described embodiments are possible. Throughout this specification, like numbered elements are used to describe the same parts throughout the various drawing figures referred to and described.

Figure 1:
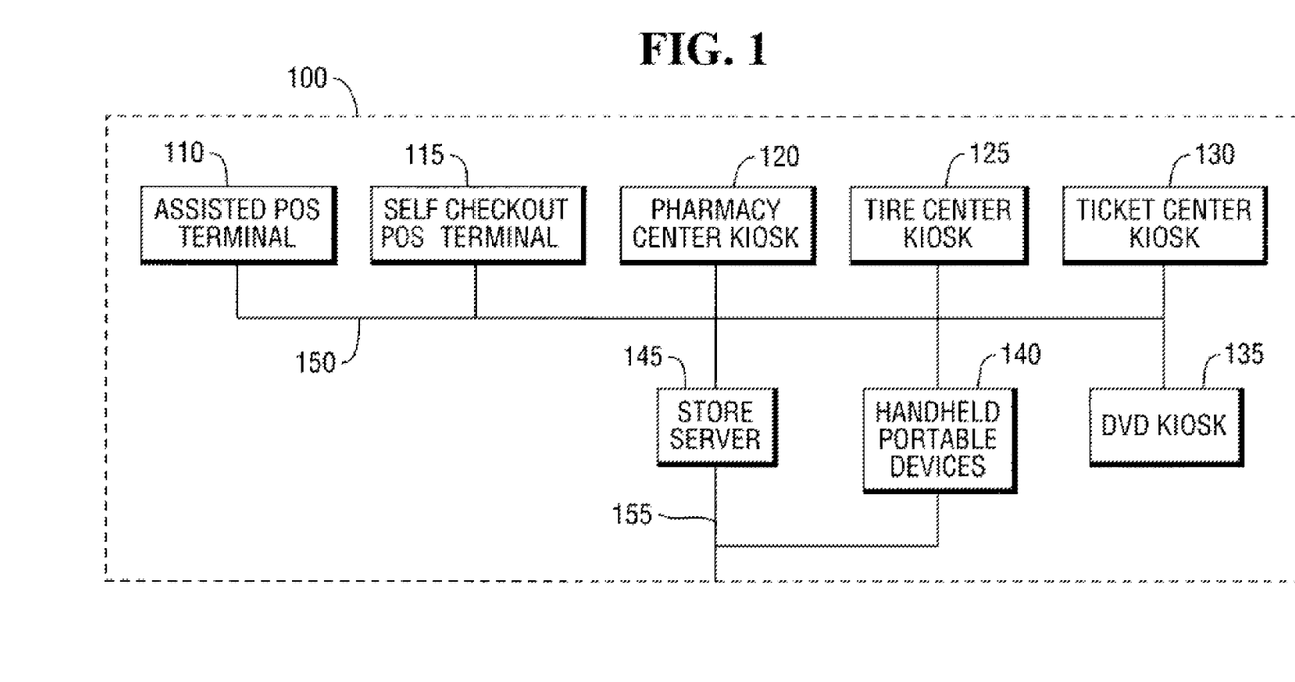
FIG. 1 is a high-level block diagram illustrating an exemplar embodiment of a retail environment including kiosks, terminals and devices.

Referring to FIG. 1, there is provided a high-level block diagram illustrating an exemplar embodiment of a retail environment 100 including kiosks terminals 120, 125, 130, 135, point-of-sale (POS) terminals 110, 115 and handheld customer devices 140. The retail environment 100 is exemplified by a retail store having numerous product and/or service centers. The centers include the following: a grocery center, a pharmacy center, a tire and auto center, an event ticket center and a DVD purchase or rental center. In other embodiments, the centers may include one or more of the above centers and/or additional centers such as an eye care center, a travel center, a banking or money center, a hair care center, a hearing care center, a nail care center or any of a number of general or personal care product or service centers.

The retail environment 100 further includes at least one computer called a store server 145 that communicates with the kiosk terminals 120, 125, 130, 135, the POS terminals 110, 115 and the devices 140 over a network 150. The network 150 includes a wired or wireless network or a combination thereof. The store server 145 communicates over an external network 155 with external computers not located within the immediate retail environment 110. The external computers provide numerous functions such as financial transactions (credit or debit) used to purchase products and/or services, updates to products or information including downloading of new digital media products offered for sale or rental and customer related information. The store server 145 may also use the external network 155 to connect to the Internet and thereby communicate with the handheld portable devices 140 that are connected to the Internet. The handheld portable devices 140 may be inside or outside the retail environment 100.

The handheld portable devices 140 are customer owned devices and include smart phones and pad or tablet type computing devices. The devices 140 have built-in communications that allow each of the devices 140 to communicate with the store server 145 using the network 150 when they are within the retail environment 100 or when they are outside the retail environment 100, using the external network 155. The external network 155 can also be used by the devices 140 to communicate with the store server 145 when they are within the retail environment 100. In some embodiments, the devices 140 communicate directly with the POS terminals 110, 115 or the kiosk terminals 120, 125, 130, 135 using the network 150 when the devices are within the retail environment 100. The devices 140 also run one or more custom applications designed to interface with the retail environment 100 to assist the customer with the purchase of one or more products and/or services provided by the retail store.

The terms platform or software platform, as used within this specification, can include a terminal, kiosk, server or handheld device.

Figure 2:
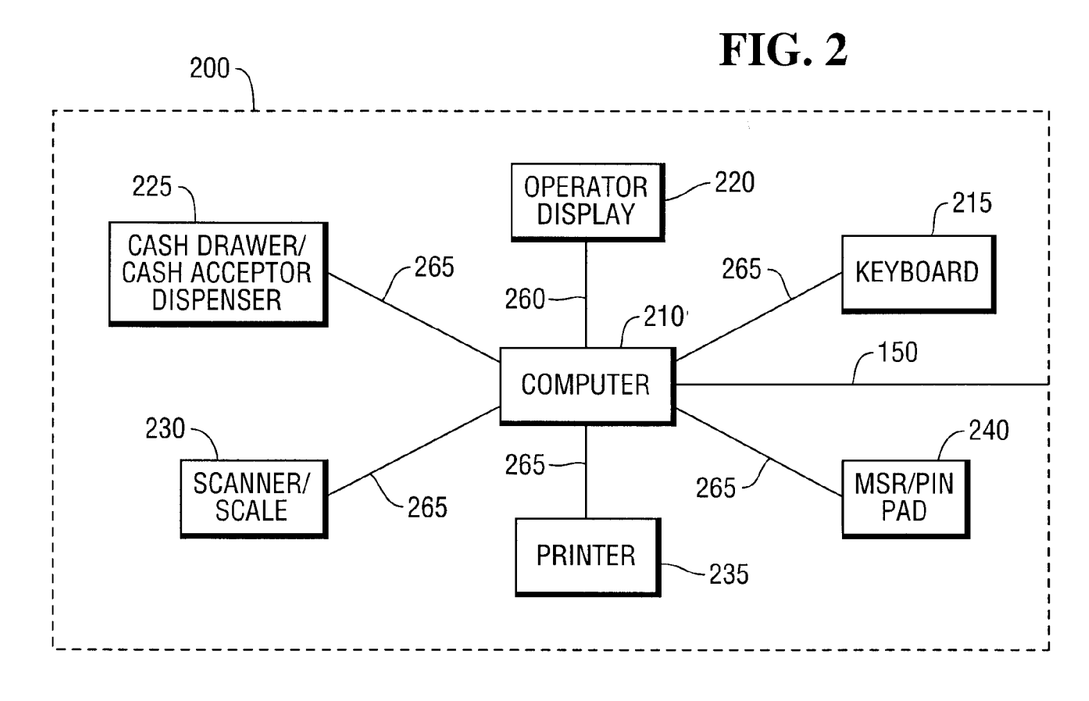
FIG. 2 is a high-level block diagram illustrating an exemplar embodiment of a terminal or kiosk.

Turning now to FIG. 2, there is presented a high-level block diagram illustrating an exemplar embodiment of a terminal 200 that may be used to implement the POS terminals 110, 115 and the kiosks terminal 120, 125, 130, 135. The terminal 200 includes a computer 210 that controls devices connected to the terminal 200. The computer 210 uses a plurality of universal serial buses (USB) 265 to connect to a keyboard 215, a cash drawer or cash acceptor dispenser 225, a scanner/scale 225, a printer 235 and a magnetic stripe reader and pin pad device 240. The computer 210 uses a high-speed digital video link 260 to send display information to the operator display 220. The operator display 220 also has a touch input device that provides user touch information to the computer 210. The computer 210 connects to the store server 145 and other terminals and devices using the network 150. The network 150 may be a wired local area network, one or more wireless networks or any combination thereof.

Terminal 200 can be implemented without including all the devices described above. An implementation of terminal 200 used as a DVD kiosk may not require the scale portion of the scanner/scale device 230. In this implementation of the terminal 200, the scale portion is not included in the terminal 200. Terminals 200 that are not used to process payments may not require the cash drawer/cash acceptor dispenser 225 or the MSR/PIN Pad 240. In some embodiments, terminals 200 used only as self-service POS terminals would not include a cash drawer 225 but would include an automatic cash acceptor and dispenser 225. In some embodiments, a terminal 200 that can be switched between an assisted and a self-service POS terminal has both a cash drawer and a cash acceptor dispenser 225.

Figure 3:
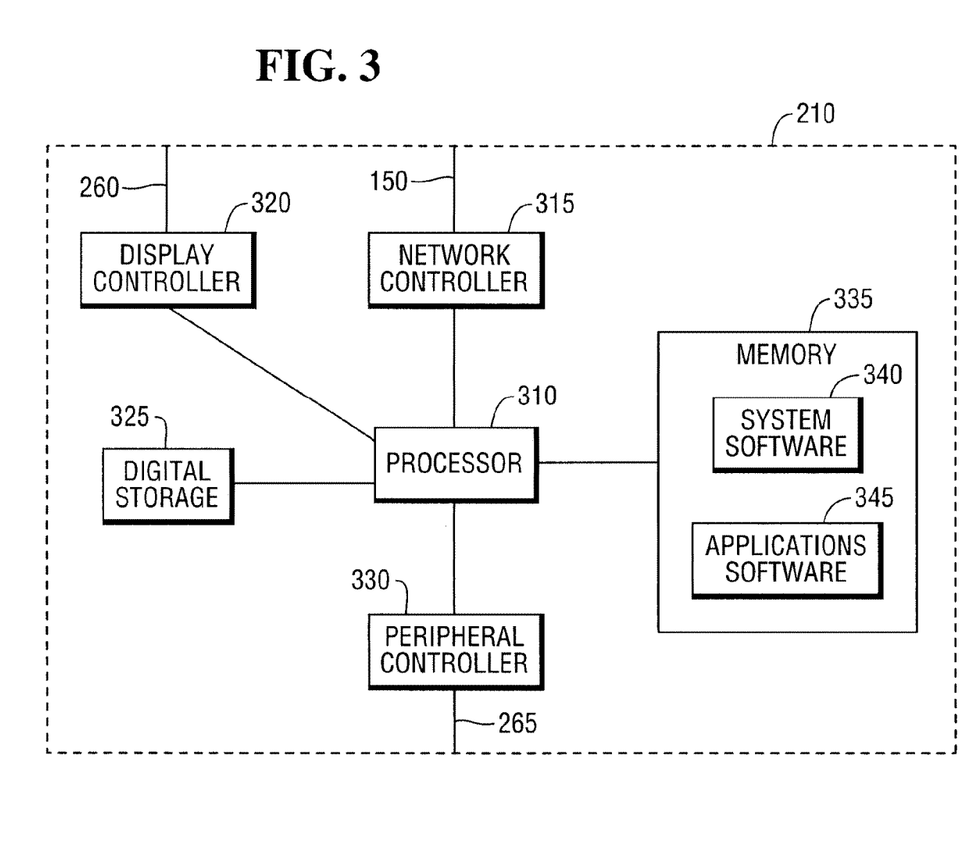
FIG. 3 is a high-level block diagram illustrating an exemplar embodiment of a computer used in the terminal or kiosk.

Turning now to FIG. 3, there is presented a high-level block diagram illustrating an exemplar embodiment of the computer 210 used in the terminal 200. The computer 210 includes a processor 310 that communicates with a computer memory 335, a network controller 315, a display controller 320, a digital storage 325 and a peripheral controller 330. The network controller 315 implements the protocols and interfaces to support the network 150 and enables the processor 310 to send and receive data over the network 150. The digital storage 325 provides long term or persistent storage of computer data including data and programs. The digital storage 325 may include solid state or rotating devices. The peripheral controller 330 implements a USB connection 265 for each device connected to the computer 210. Each USB connection 265 enables the processor 310 to communicate with and control the attached device. The display controller 320 controls the attached operator display 215 using the digital video link 260 and enables the processor 310 to display information on the operator display 215.

The computer memory 335 is a high-speed digital memory used to store instructions executed by the processor 310 and data that is manipulated by the processor 310. The instructions and data are organized into programs and the programs are organized by general function into two groups referred to as system software 340 and application software 345. The system software 340 controls the devices of the terminal 200 and provides and maintains an environment for running the application software 345. The application software 345 generates high-level features and functions that use the devices of the terminal 200. Application software that provides low-level functions for the retail environment is also referred to as system software 340.

Figure 4:
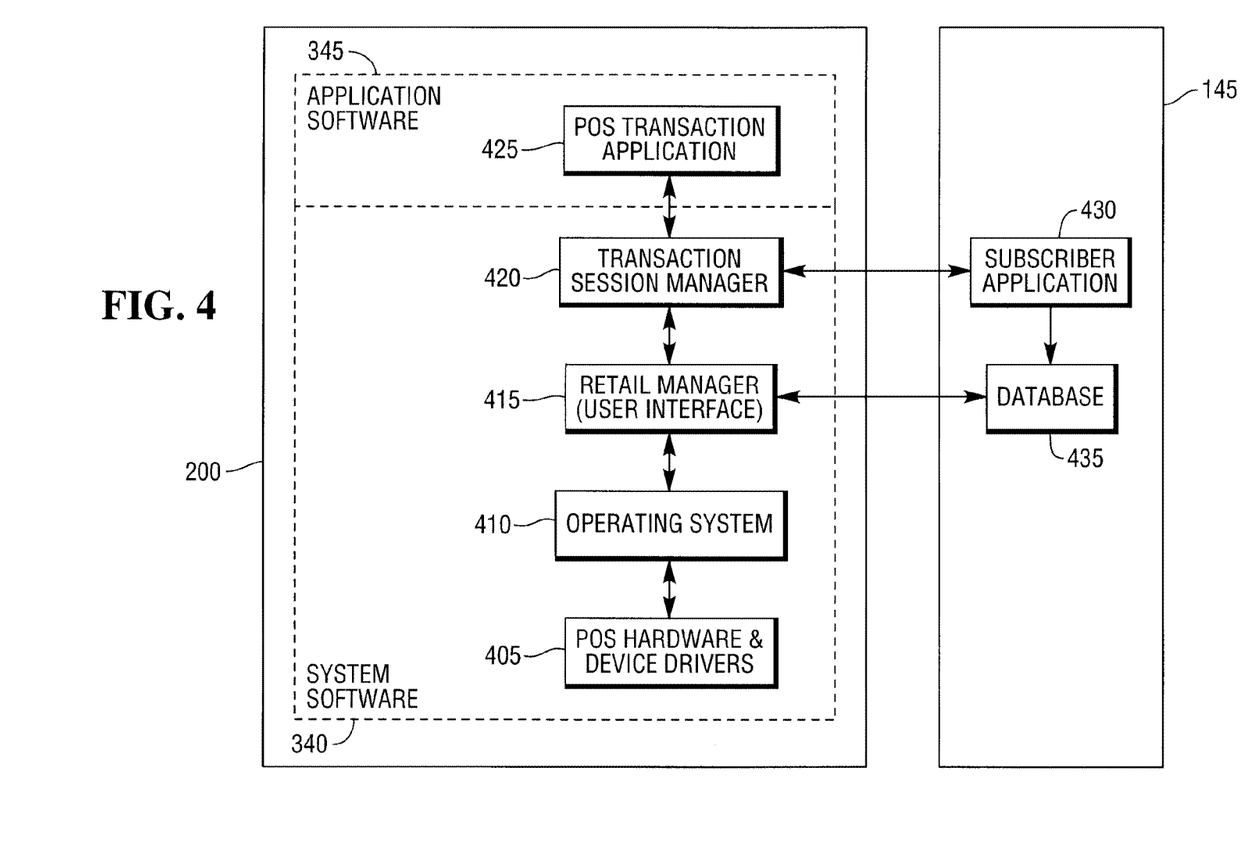
FIG. 4 is a high-level block diagram illustrating an exemplar embodiment of software running on the terminal or kiosk and a store server.

With reference to FIG. 4, there is provided a high-level block diagram illustrating an exemplar embodiment of software running on the terminal 200 and the store server 145. The terminal 200 of this example is implemented as a POS terminal (either assisted 110 or self-checkout 115). The software running on terminal 200 is divided into application software 345 and system software 340. The system software 340 includes POS hardware & device drivers 405, an operating system (OS) 410, a retail manager 415 and a transaction session manager 420. The POS hardware and device driver 405 software interfaces directly with and permits the OS 410 to control the POS hardware and devices.

The OS 410 manages the operation of the terminal 200 and provides a basic program environment for the other system software 340 applications and the application software 340 to execute in. The retail manager 415 is a system software 340 application tailored to provide low-level POS related functions in additional to the basic program environment provided by the OS 410. The retail manager 415 will identify POS related devices attached to the terminal 200 and provide specific POS related functions that use these and the standard devices. For example, if the retail manager 415 identifies a cash dispenser 225, it provides additional features to the program environment related to the cash dispenser 225 such as dispensing a requested amount of cash. Additionally, if the retail manager 415 identifies an item scanner 230, it provides additional features to the program environment related to the item scanner 230 such as providing information about a scanned item by receiving item identification data from the item scanner, use the item identification data to perform a product lookup and then provide information about the scanned item that includes a description of the item and a price. The retail manager 415 further provides the basic features of the user interface that are displayed on the operator display 220. Application software 345 will customize the basic user interface for the type of application being performed e.g., the PTA 425 will customize the basic user interface for POS transactions and pharmacy center application (not shown) will customize the user interface for pharmacy transactions.

The retail manager 415 also provides features to identify a customer and the customer's preferences. The preferences along with other customer information are stored in a database 435 maintained on the store server 145. The retail manager 415 has access to the database 435 and stores, updates or retrieves information from the database 435 as needed or as requested by the application software 425. These are just some of the features provided by the retail manager 415 and that are added to the program environment provided by the OS 410.

The transaction session manager 420 sits logically on top of the retail manager 415 and provides the features of the program environment created by the OS 410, with the features of the retail manager 415 and certain additional features to the application software 335. Additional details concerning the transaction session manager 420 will be provided below.

In the present embodiment, the application software 345 includes a POS transaction application (PTA) 425. The PTA 425 provides a number of functions including controlling the devices attached to the terminal 200, providing a custom user interface tailored to point-of-sale functions and performing one or more purchase transactions.

A purchase transaction includes identifying a customer performing the transaction and then identifying one or more items presented to the terminal 200 for purchase or one or more services for purchase. Once all items and/or services that are part of the transaction have been identified, priced and totaled, a payment for the total price is processed to complete the purchase transaction. During the transaction, the PTA 425, using the user interface provided by the retail manager 415, displays information about the transaction on the operator display 220. In addition, the PTA 425 prints a receipt of the transaction using the printer 235.

The PTA 425 is designed to receive an external message request and to display the message part of the external message request. During a purchase transaction, the transaction session manager 420 can send the PTA 425 an external message request. The PTA 425 receives the external message request, identifies it and then displays the message contents on the operator display 220 according to format information in the message. In some embodiments, a pop-up window is used to display the message. The message may include a trigger that when selected causes the PTA 425 to simply remove the message from the operator display 220 with no further action. The message may also include an encoded trigger which includes an encoded request that when selected causes the PTA 425 send the encoded request to the transaction session manager 420. The transaction session manager 420 will then process the encoded request and take the requested action.

When the terminal 200 is configured to support other retail centers, the application software 345 includes one or more applications that support the features and function for the supported retail center. For example, a terminal 200 configured to be a pharmacy center kiosk 120 would include a pharmacy center application. The pharmacy center application includes the ability to allow a customer to check the status of a prescription or to request a refill for a prescription. A terminal 200 configured to be a tire center kiosk 125 includes a tire center application. The tire center application includes the ability to allow a customer to schedule work such as an oil change or check the status of work being performed. Similarly, a terminal 200 configured to be a ticket center kiosk 130 includes a ticket center application. The ticket center application includes the ability to allow a customer to check the availability of and to purchase tickets for an event. A terminal 200 configured to be a DVD kiosk 135 includes a DVD application. The DVD application includes the ability to allow a customer to select available DVDs for purchase or rental.

Any of the above application software 425 will store customer information in the database 425 on the store server 145. The customer information may include prescription refill information, oil change history, scheduled appointments, event ticket purchase information, DVD retail history and more.

It should be noted that the transaction session manager 420 is transparent to the PTA 425 and the retail manager 415. Even though the PTA 425 communicates directly with the transaction session manager 420, the PTA 425 appears to be in direct communication with the retail manager 415 because the transaction session manager 420 forwards communications from the PTA 425 to the retail manager 415 and forwards communications from the retail manager 415 to the PTA 425. The transaction session manager 420 also provides additional features.

In some embodiments, the PTA 425 only communicates with the transaction session manager 420 for certain functions provided or filtered by the transaction session manager 420. Other communications from or to the PTA 425 are allowed to occur without being filtered or monitored by the transaction session manager 420. These other communications would be with the retail manager 415 or OS 410.

The transaction session manager 420 filters or monitors the communications between the retail manager 415 and the PTA 425 looking for communications that identify the customer using the terminal 200. When a customer begins a purchase transaction, the PTA 425 will identify the customer and send this information to the retail manager 415. The transaction session manager 420 receives the communication and makes a copy of the customer identification data and then forwards the communication to the retail manager 415. The transaction session manager then sends the customer identification data to a subscriber application 430 executing on the store server 145. The subscriber application 430 is aware of all the different types of application software 425 that execute on the different terminals 200 supporting the different retail centers and of the customer information they store in the database 435.

The subscriber application 430 uses the customer identification data to access the customer's data in the database 435 and to determine if a message should be sent to the customer while the customer is performing the purchase transaction. For example, if a prescription refill is ready for pick up, the subscriber application 430 will generate an external message and send it to the transaction session manager 420. The transaction session manager 420 will then send the external message to the PTA 425 where the message is displayed to the customer on the operator display 220. The message includes a notice that their prescription refill is ready to be picked up. The message further contains a trigger that when selected causes the PTA 425 to remove the message from the operator display 220. Another pharmacy example would be annual vaccination reminder.

In another example, the subscriber application 430 determines the customer's vehicle is due for an oil change. The subscriber application 430 generates an external message with the oil change information and with two triggers. The external message is sent to the transaction session manager 420 which sends the message to the PTA 425. The PTA 425 then displays the external message. The message contains one trigger that when selected causes the PTA 425 to remove the message from the operator display 220. This trigger equates to a "CLOSE" or "EXIT" or "NO" command that is selected after the message has been read and no further action is required or desired by the customer.

The second trigger has an encoded request. In this example, the encoded request is tied to a request to schedule an oil change for this customer. The customer selects this trigger to schedule an oil change. The encoded request is send by the PTA 425 to the transaction session manager 420, which then forwards the request back to the subscriber application 430. The subscriber application 430 then sends a command to the transaction session manager 420 requesting to take over the operation of the terminal 200 including the operator display 220 from the PTA 425. At this point, the transaction session manager 420 saves a copy of the data being displayed on the operator display 220 and transfers control of the operator display 220 and the terminal 200 to the subscriber application 430. In some embodiments, the transaction session manager 420 will open a new window on the operator display 200 and transfer control of just the new window to the subscriber application 430. The subscriber software 430 then generates the proper user interface to allow the customer to schedule an oil change. The schedule information is stored in the database 435. When the scheduling is complete, the subscriber application 430 will terminate remote control of the terminal 200 and the transaction session manager 420 will restore the information on the operator display 220 and the PTA 425 will continue the purchase transaction as if nothing occurred. Taking control of the operator display 220 and input devices to schedule the oil change is transparent to the PTA 425 and control is restored to the PTA 425 when the subscriber application 430 has completed the requested task.

In another example, the subscriber application 430 examines the customer's event ticket purchases and determines that a ticket for a favorite event is now available. The subscriber application 430 generates an external message with the event information and with two triggers. The external message is sent to the transaction session manager 420, which sends the message to the PTA 425. The PTA 425 then displays the external message. The message contains one trigger that when selected causes the PTA 425 to remove the message from the operator display 220. This trigger equates to a "CLOSE" or "EXIT" or "NO" command that is selected after the message has been read and no further action is required or desired by the customer.

The second trigger has an encoded request. In this example, the encoded request is tied to a request to purchase an event ticket for this customer. The customer selects this trigger to select and purchase the event ticket. The encoded request is send by the PTA 425 to the transaction session manager 420, which then forwards the request back to the subscriber application 430. The subscriber application 430 decodes the request and determines it is a request to select and purchase an event ticket by the customer. The subscriber application 430 then sends a command to the transaction session manager 420 requesting to take remote control of the operation of the terminal 200 from the PTA 425. At this point, the transaction session manager 420 saves a copy of the data being displayed on the operator display 220 and transfers control of the terminal 200 to the subscriber application 430. In some embodiments, the transaction session manager 420 will open a new window on the operator display 200 and transfer control of the new window to the subscriber software 430. The subscriber application 430 then generates the proper user interface to allow the customer to select and purchase the event ticket. The ticket information is stored in the database 435. The customer will have two options for purchasing the ticket. One is to enter credit card information and have it processed immediately and the other is have the ticket cost added to the current purchase transaction.

If the customer selects to pay immediately, a credit card can be entered using the MSR 240 or credit card information stored in the database 435 can be used. The subscriber application 430 processes the payment, prints the ticket and receipt using the printer 235 and returns control back to the PTA 435.

If the customer selects to add the cost of the ticket to the current transaction, the subscriber application 430 returns control of the terminal 200 back to the PTA 435 and then sends a command to the transaction session manager 420 to simulate the scanning of an item where the item data represents the event ticket selected by the customer. The transaction session manager 420 sends scanned item information to the PTA 435 so that the PTA 435 reacts like the event ticket was scanned for purchase. The PTA 435 then added the cost of the event ticket to the purchase transaction and once the payment is made for the transaction, the event ticket is printed with the transaction receipt.

In some embodiments, the subscriber application 430 includes multiple applications where a first of the applications monitor information received from the transaction session manager 420 and sends the proper external message to be displayed. If a customer selects a service from the displayed external message, the first application may handle the service request or send the service request to another one of the subscriber applications 430 to handle the service. For example, the first application may handle service requests for the tire center and pharmacy but may call another application to handle a service request for the ticket center.

Figure 5:
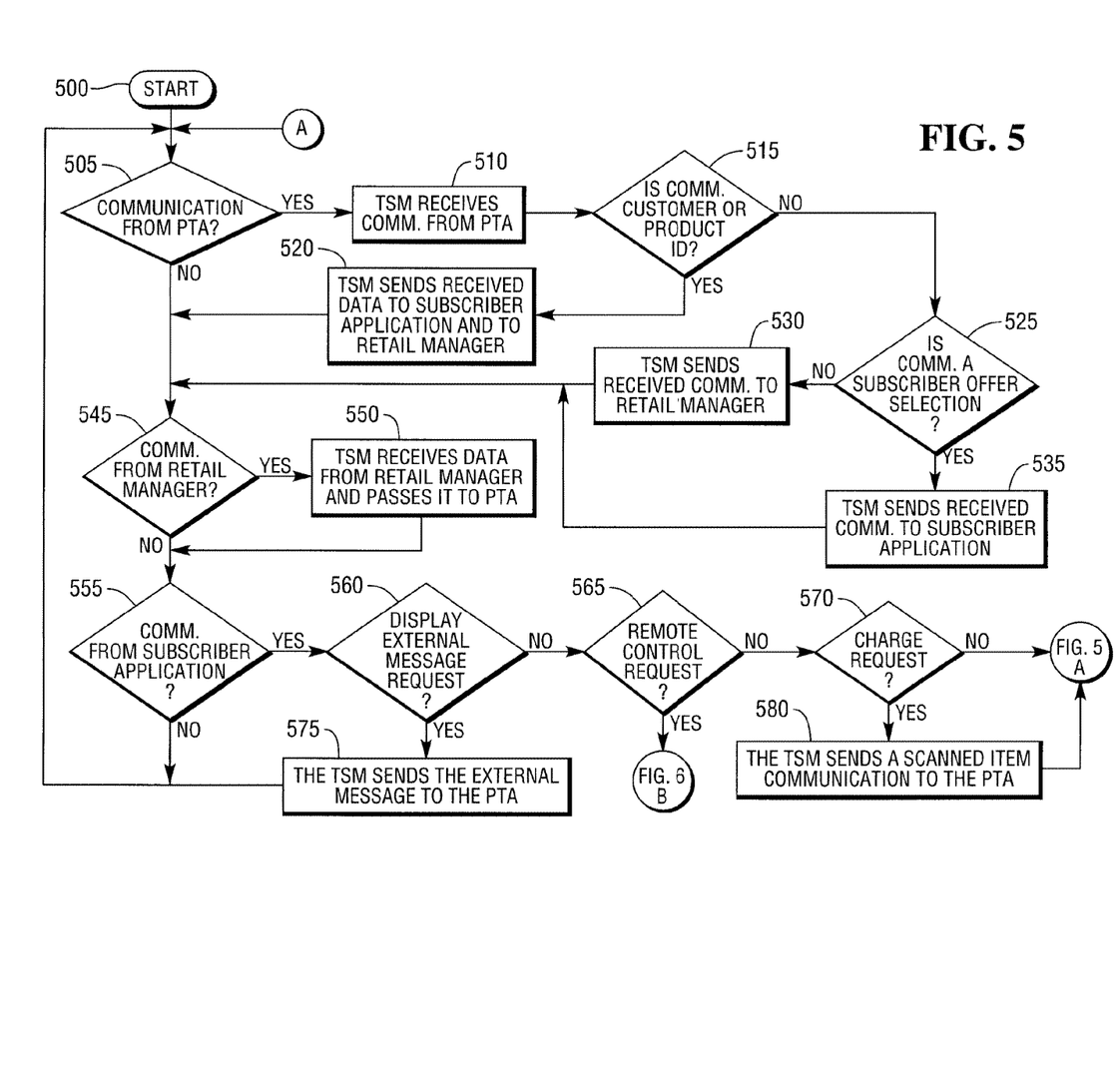
FIG. 5 is a high-level flow diagram illustrating a first portion of an exemplary method uses by a transaction session manager.

Turning now to FIG. 5, there is provided a high-level flow chart depicting a method used by the transaction session manager (TSM) 420. The TSM 420 logically sits between and monitors the communications between the retail manager 415 and the POS transaction application (PTA) 425. The TSM 420 also communicates with the subscriber application 430 executing on the store server 145. The TSM 420 is transparent to the PTA 425 but the TSM 420 can take control of the terminal 200 from the PTA 425 and allow the subscriber application 430 to remotely control the operation of the terminal 200. Remotely controlling the operation of the terminal 200 includes allowing the subscriber application 430 to control the devices connected to the terminal 200 and to communicate with the customer by controlling the user interface (UI). When the terminal 200 is being remotely controlled, the PTA 425 is not aware that it does not have control of the terminal 200.

The TSM 420 starts (step 500) by determining if the PTA 425 is sending a communication (step 505). Since the TSM 420 is transparent to the PTA 425, the communication is intended for the retail manager 415 but the communication passes through the TSM 420. If there is a communication, the TSM 420 receives the data associated with the communication from the PTA 425 (step 510). The TSM 420 analyzes the data to determine is the communication has information that identifies a customer that is using the terminal 200 (step 515). If customer identification information is found in the communication, the TSM 420 sends a copy of the communication to the subscriber application 430, forwards the communication to the retail manager 415 (step 520) and continues to step 545.

In some embodiments, the TSM 420 will also determine if a product ID is present in the communication and will process the product ID as if it were customer identification. This allows the subscriber application 430 to response by making a subscriber offer to the customer (using an external message) that is related to the product ID.

If the communication is not a customer identification command, the TSM 420 determines if the communication is the result of a customer selecting a subscriber offer (encoded trigger) that was displayed by the subscriber application 430 on the operator display 220 (step 525). If the communication is not the result of a subscriber offer, the TSM 420 forwards the communication to the retail manager 415 (step 530) and continues to step 545. If the communication is the result of a subscriber offer, the TSM 420 sends a copy of the communication to the subscription application 430 (step 535) and then continues to step 545.

A subscriber offer is an offer included in an external message sent to the PTA 425 from the subscriber application 430 after the subscriber application 430 has identified a customer using the terminal 200 or identified an item being purchased at the terminal 200. The external message has an encoded trigger that when selected causes a communication to the sent by the PTA 425. The TSM 420 receives the communication and determines that it is the result of a subscriber offer being selected and sends the communication to the subscriber application 430 to be processed.

At step 545, the TSM 420 determines if a communication is being sent by the retail manager 415 to the PTA 425. If there is a communication, the TSM 420 receives the communication from the retail manager 415 and passes it to the PTA 425 (step 550).

At step 555, the TSM 420 determines if a communication from the subscriber application 430 has been received. If no communication has been received, control passes to step 505. If a communication has been received, the communication is analyzed to determine what type of request is being made. At step 560, the TSM 420 determines if an external message request is present. If it is, control passes to step 575 where the TSM 420 sends a communication to the PTA 425 to display the message contained in the communication. In step 565, if the communication is not an external message request, the TSM 420 determines if a remote control request is present. If it is, control passes to entry point "B" in FIG. 6. In step 570, if the communication is not a remote control request, the TSM 420 determines if a charge request is present. If it is, the TSM 420, in step 580, sends a communication to the PTA 425 that simulates the scanning and identification of an item that is identified in the charge request from the subscriber application 430. The PTA 425 processes the item as if it were presented and scanned at the terminal 200 for purchase. The item can be a product or service and is the result of a customer agreeing to purchase the product or service while the terminal 200 was being remotely controlled by the subscriber application 430.

Figure 6:
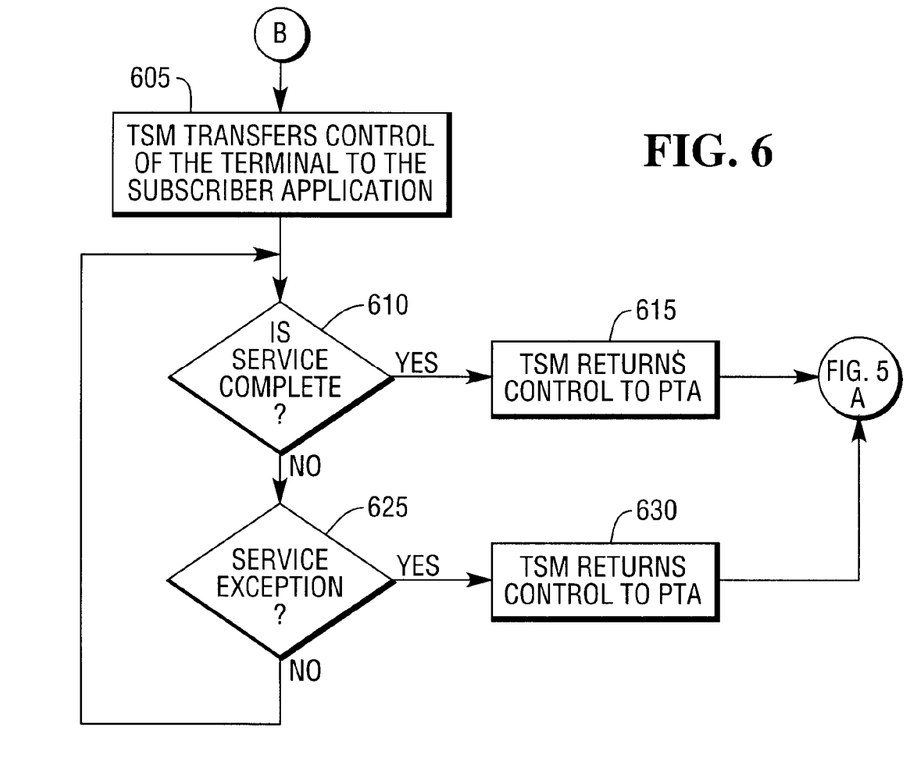
FIG. 6 is a high-level flow diagram illustrating a second portion of an exemplary method uses by the transaction session manager.

Turning to FIG. 6, there is provided a high-level flow chart further depicting the method of FIG. 5 uses by the transaction session manager (TSM) 420. When the TSM 420 receives a communication from the subscriber application 430 requesting to remotely control the terminal 200, control passes to step 605. In step 605, the TSM 420 implements a remote terminal control function that transfers control of the terminal 200 to the subscriber application 430. The subscriber application 430, when it receives control of the terminal 200, performs a service that was requested by a customer. Examples of the services include, requesting a prescription refill, scheduling service on vehicle, renting or purchasing a video product, purchasing event tickets, scheduling an eye care appointment and banking functions.

In step 610, the TSM 420 determines if the subscriber application 430 has completed providing the requested service. If the service is completed, the TSM 420 ends the remote control of the terminal 200 and returns control to the PTA 425 (step 615). The method then continues to element "A" on FIG. 5. If the service is not complete, the TSM 420 determines if a service exception has occurred (step 625). A service exception occurs when it is determined that the subscriber application 430 is no longer responding. In step 630, if a service exception has occurred, the TSM 420 ends the remote control of the terminal 200 by the subscriber application 430 and returns control of the terminal 200 to the PTA 425 to continue with the purchase transaction.

Although particular reference has been made to terminals and kiosks used in certain retail centers and examples have been provided illustrating the invention, certain other embodiments, variations and modifications are also envisioned within the spirit and scope of the following claims. For example, the TSM 420 will function equally well in terminals that support other types of retail or service centers such as a lotto kiosk. In some embodiments, the subscriber application 430 and database 435 may reside on a terminal or kiosk that are performing other functions such as the ones depicted in FIG. 1. In some embodiments, the TSM 420 is part of a web server implementation and provides the same improvements to web based applications as it does for the above described application software 345.

We claim:

1. A software platform, the platform comprising:
a retail manager application adapted to control a plurality of devices attached to the platform and to generate a user interface, wherein the platform is a Point-Of-Sale (POS) terminal located at a first retail center, the retail manager application configured to execute on the POS terminal;
a retail application executing on the POS terminal and in communication with the retail manager application and adapted to: 1) provide a high-level retail function for interacting with the devices of the POS terminal, 2) provide a customized user interface for interacting with a specific type of application being processed, wherein the retail application is associated with a second retail center, and 3) operate one or more of the plurality of devices controlled by the retail manager application;
a transaction session manager application executing on the POS terminal and adapted to transparently manage the communication between the retail manager application and the retail application and to identify a first data item being transparently communicated from the retail application to the retail manager application and to send a copy of the first data item to a first server application executing on another platform associated with the second retail center, and wherein the transaction session manager is further adapted and configured to further customize the customized user interface to separately interact with a user and perform functions in a manner that is transparent to the retail manager application, system software that manages the software platform, hardware attached to the POS terminal, and the retail application, and wherein the software platform is further configured to execute existing retail applications that executed on the POS terminal before installation and execution of the software platform without modification to those existing applications, wherein those existing retail applications are relevant to the first retail center, and wherein the transaction session manager application is further configured to provide a communication to the retail manager application that simulates a scan communication at the POS terminal and indicating that the first data item was scanned causing the retail manager application to add item details for the first item to a transaction at the POS terminal.

2. The software platform of claim 1, where the first data item includes data identifying a customer using the customized user interface to perform the high-level retail function.

3. The software platform of claim 2, where the transaction session manager application is further adapted to receive a first server information from the first server application and to communicate the first server information to the retail application so that the first server information appears to be communicated from the retail manager.

4. The software platform of claim 3, where the retail application displays at least part of the first server information on a display attached to the platform and where the displayed first server information includes a user selectable encoded trigger.

5. The software platform of claim 3, where the first server information includes data identifying a first item for purchase where the data has the same format as an item scanned for purchase on the software platform and where the retail application adds the first item to a purchase transaction.

6. The software platform of claim 4, where the transaction session manager application identifies a second data item being transparently communicated from the retail application where the second data item includes the encoded trigger and where the transaction session manager application sends the second data item to the first server application.

7. The software platform of claim 1, where the transaction session manager application is further adapted to provide remote control of the platform by transferring control of the user interface and operation of the plurality of devices attached to the platform from the retail application to a remote application.

8. The software platform of claim 7, where the remote application is the first server application and the first server application is adapted to perform a second high-level retail function on the platform that is different from the high-level retail function provided by the retail application by remotely controlling the platform.

9. The software platform of claim 1, where the high-level retail function provided by the retail application is a tire center function where a customer schedules service on a vehicle and checks the status service being performed.

10. The software platform of claim 1, where the high-level retail function provided by the retail application is a pharmacy center function where a customer requests a prescription re-fill and checks the status of the prescription re-fill.

11. The software platform of claim 1, where the high-level retail function provided by the retail application is a ticket center function where a customer purchases tickets for an event.

12. The software platform of claim 1, where the high-level retail function provided by the retail application is a DVD kiosk function where a customer rents or purchases a DVD.

* * * * *